(12) United States Patent
Adkins et al.

(10) Patent No.: US 8,306,950 B2
(45) Date of Patent: Nov. 6, 2012

(54) MANAGING DATA ACCESS REQUESTS AFTER PERSISTENT SNAPSHOTS

(75) Inventors: Janet E. Adkins, Austin, TX (US); Joon Chang, Austin, TX (US); Robert K. Gjertsen, Austin, TX (US); Ninad S. Palsule, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 12/868,877

(22) Filed: Aug. 26, 2010

(65) Prior Publication Data
US 2012/0054152 A1   Mar. 1, 2012

(51) Int. Cl.
G06F 7/00 (2006.01)
G06F 17/00 (2006.01)
(52) U.S. Cl. ........ 707/639; 707/695; 707/822; 709/216; 711/161; 711/162; 711/E21.103
(58) Field of Classification Search ............ 707/638, 707/639, 695, 822, E17.01, E17.032, 623, 707/E17.044; 709/216; 711/161, 162, E12.103
See application file for complete search history.

(56) References Cited

U.S. PATENT DOCUMENTS

| | | | |
|---|---|---|---|
| 6,711,632 B1 * | 3/2004 | Chow et al. .................. 711/143 |
| 6,748,504 B2 | 6/2004 | Sawdon et al. | |
| 6,925,515 B2 | 8/2005 | Burns et al. | |
| 7,200,686 B2 * | 4/2007 | Chang et al. ................. 710/5 |
| 7,337,360 B2 | 2/2008 | Shen et al. | |
| 7,523,277 B1 * | 4/2009 | Kekre et al. .................. 711/162 |
| 7,685,169 B2 * | 3/2010 | Hitz et al. .............. 707/999.201 |
| 7,822,711 B1 * | 10/2010 | Ranade .......................... 707/622 |
| 7,836,029 B2 * | 11/2010 | Shoens .......................... 707/695 |
| 2003/0159007 A1 * | 8/2003 | Sawdon et al. ................. 711/154 |
| 2004/0268068 A1 * | 12/2004 | Curran et al. .................. 711/162 |
| 2006/0206536 A1 * | 9/2006 | Sawdon et al. ............... 707/200 |
| 2007/0260830 A1 * | 11/2007 | Faibish et al. ................ 711/162 |
| 2007/0260842 A1 * | 11/2007 | Faibish et al. ................ 711/170 |
| 2009/0119304 A1 * | 5/2009 | Preslan et al. .................. 707/10 |
| 2009/0271412 A1 * | 10/2009 | Lacapra et al. ................. 707/10 |

OTHER PUBLICATIONS

Tzi-cker Chiueh and Lan Huang—"Track-Based Disk Logging"—Proceedings of the International Conference on Dependable Systems and Networks (DSN'02), 2002 IEEE—(pp. 429-438).*
Lingfang Zeng, Dan Feng, Zhan Shi, Jianxi Chen, Qingsong Wei and Zhixiang Li—"A high-speed and low-cost storage architecture based on virtual interface"—Front. Comput. Sci. China 2007, vol. 1, No. 4, 2007, Jun. 12, 2007; accepted Sep. 24, 2007, pp. 478-492.*

* cited by examiner

*Primary Examiner* — Jean B Fleurantin
*Assistant Examiner* — Anh Ly
(74) *Attorney, Agent, or Firm* — DeLizio Gilliam, PLLC

(57) ABSTRACT

A client node on which a file system is mounted can be configured to efficiently handle content access requests after a snapshot is created. The client node can maintain generation numbers at a data block, a file, and a fileset level to determine whether a data block is part of a snapshot generation and consequently whether the data block is writable in a current generation. Data block mappings and write access permissions associated with the data blocks need not be revoked at the client node prior to creating the snapshot. Cached data block mappings can be accessed to identify data blocks for servicing a read request. The data block can be updated in place if the data block is not part of the snapshot generation. The write request can be serviced at a new data block if the data block is part of the snapshot generation.

16 Claims, 8 Drawing Sheets

MANAGING DATA ACCESS REQUESTS AFTER PERSISTENT SNAPSHOTS

BACKGROUND

Embodiments of the inventive subject matter generally relate to the field of data storage, and, more particularly, to managing data access requests after a persistent snapshot.

A snapshot is a point-in-time copy of a storage device (e.g., data that constitutes one or more files of a file system) that represents a state of the storage device in time. The snapshot is used as a backup of the data of the file system so that a previous state of the data of the file system can be accessed/restored in the event of data corruption. The snapshot may be a non-persistent snapshot or a persistent snapshot. A non-persistent snapshot is a temporary snapshot that is created at every pre-defined time interval, while a persistent snapshot is stored permanently and is available across reboots until it is explicitly deleted. Creating a snapshot involves recording a current state of the data at the time at which the snapshot is to be created. Creating the snapshot also involves ensuring that the previously stored version of the data is not overwritten by subsequent updates to the data. Various techniques (e.g., copy-on-write, redirect-on-write, etc.) can be implemented to create the snapshot of the file system.

SUMMARY

Various embodiments for managing data access requests after a persistent snapshot are disclosed. In one embodiment, a first generation number is associated with one or more files of a clustered file system at a client node on which the file system is mounted. The first generation number indicates a state of the one or more files following a snapshot of the one or more files. In response to a write request directed to a first data block associated with the one or more files it is determined whether the first data block is part of the snapshot of the one or more files based, at least in part, on the first generation number. The first data block is updated in accordance with the write request if it is determined that the first data block is not part of the snapshot of the one or more files. If it is determined that the first data block is part of the snapshot of the one or more files, an allocation request for a second data block for servicing the write request is transmitted to a server. The second data block is updated in accordance with the write request.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
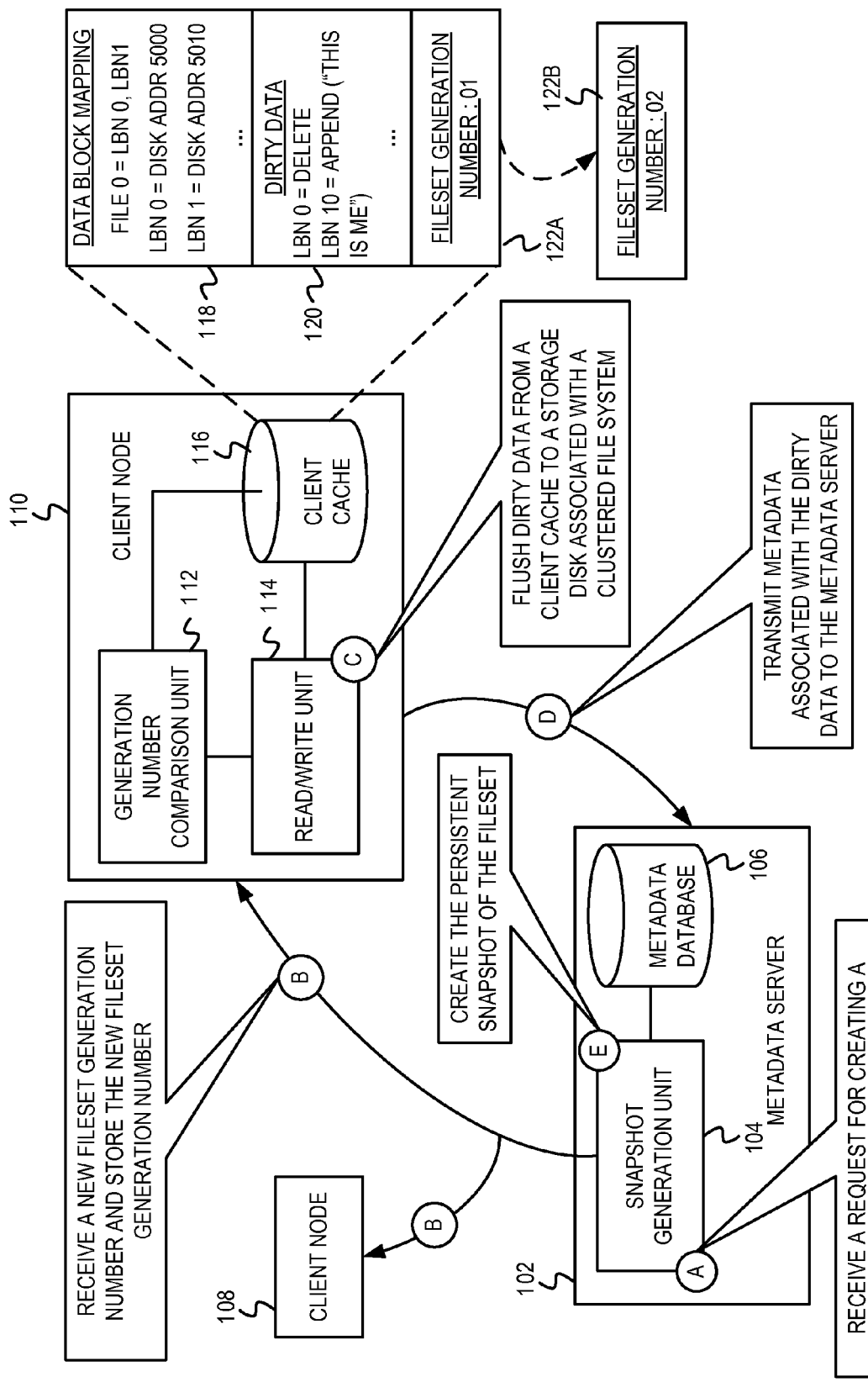
FIG. 1 depicts an example conceptual diagram illustrating example operations for creating a persistent snapshot.

The description that follows includes exemplary systems, methods, techniques, instruction sequences, and computer program products that embody techniques of the present inventive subject matter. However, it is understood that the described embodiments may be practiced without these specific details. For instance, although examples refer to creating a persistent snapshot for a fileset (i.e., a group of files), the persistent snapshot can be created for an individual file. In other instances, well-known instruction instances, protocols, structures, and techniques have not been shown in detail in order not to obfuscate the description.

Some existing file systems create a persistent snapshot of one or more files of the file system by causing client nodes (on which the file system is mounted) to revoke, from their respective client caches, all data block mappings (i.e., mapping between a set of bits ("data block") in virtual space ("logical data block") and a set of bits on a physical storage unit ("physical data block") and access permissions associated with the one or more files. However, in a persistent snapshot, content of a physical data block is designated as both the snapshot version of the content and the current version of the content until a write request for updating the content of the physical data block is received. Therefore, purging all the data block mappings adds a performance penalty for read operations and requires the client nodes to rebuild their respective client cache (e.g., determine new data block mappings, re-populate the client cache with the new data block mappings, etc.) after the snapshot is created. Reconstructing the client cache after the snapshot is created can be time consuming and can involve increased communication between the client nodes and a managing server, further increasing overhead. Some existing file systems can also create the persistent snapshot by causing the client nodes to modify each individual data block mapping as a read-only mapping for each of the files for which the persistent snapshot is to be created. However, this entails traversing all the data block mappings in the client cache, identifying the physical data blocks that are associated with the files for which the persistent snapshot is to be created, and updating the corresponding access permission from a write permission to a read-only permission. This can be a computationally intensive and a time intensive process depending on the size of the client cache and the number of access permissions in the client cache.

The file system can be configured to implement a technique for creating a less computationally intensive persistent snapshot by allowing the client node to determine whether a physical data block can be updated in place or whether a new physical data block is to be allocated for updating the content of the physical data block. The client nodes can also be prevented from erasing the data block mappings and access permissions stored in the client cache. To determine whether the physical data block that maps to a logical data block can be updated after a persistent snapshot, the client node can keep track of a generation number (i.e., a version number) of the logical data block, a generation number of a file to which the logical data block belongs, and a generation number of a fileset (i.e., a group of files) to which the file/logical data block belong. The client node can use these generation numbers to determine whether the physical data block to be updated is part of the persistent snapshot. The generation number of a fileset (or alternatively, a file) is incremented each time a persistent snapshot of the corresponding fileset (or file) is created. The client node can compare the generation number of the logical data block to be updated with the generation number of the file with which the logical data block is associated and also with the generation number of the fileset to which the file belongs. The physical data block that maps to the logical data block is deemed to be writable (i.e., the physical data block is not part of the snapshot and can be updated) if the generation number of the logical data block is greater than the generation number of the file with which the logical data block is associated and also the generation number of the fileset to which the file belongs. Otherwise, the physical data block is deemed to be part of the snapshot and a new physical block is allocated.

Configuring the client node to compare generation numbers prior to updating the physical data block can preclude the need for erasing the data block mappings in the client cache and revoking write permissions associated with the physical data blocks. This can improve the efficiency associated with creating the persistent snapshot because the write permissions are revoked only after a first write request to a physical data block is received after the persistent snapshot is created. Any read requests can be serviced based on the data block mappings in the client cache, thus precluding the need for the client nodes to communicate with the server to service the read requests. Furthermore, configuring the clustered file system to avoid allocation of a new physical data block each time a write request is received (e.g., as in a traditional redirect-on-write snapshot), can minimize the number of physical data blocks allocated, can minimize the amount of metadata that is to be maintained for keeping track of different versions of the physical data blocks, and can minimize effort involved in consolidating content across the different versions of the physical data blocks to maintain data consistency. This can further improve efficiency especially if data block translations are retained in the client cache for long periods of time and are not affected by periodic snapshots.

Figure 2:
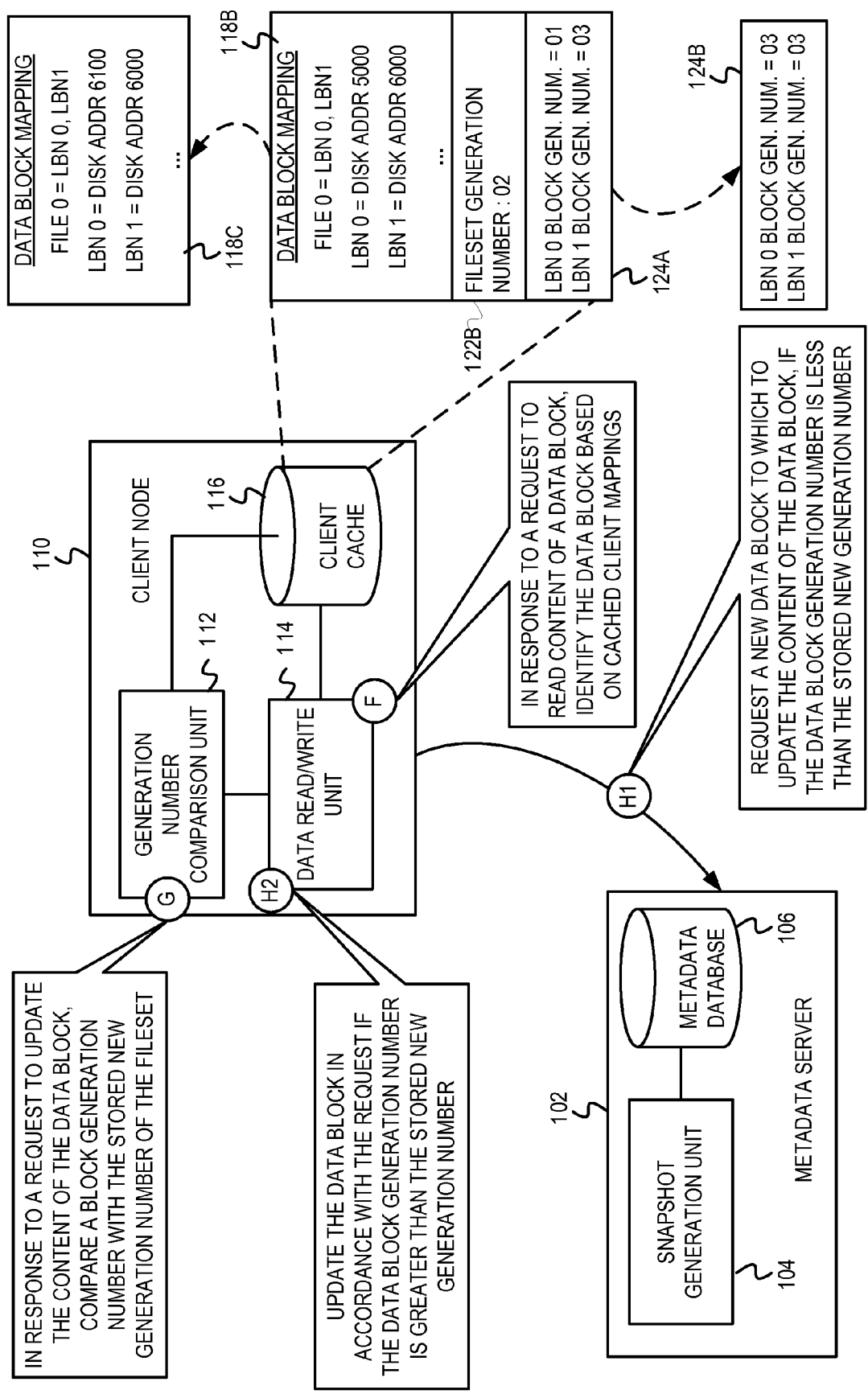
FIG. 2 is a continuation of FIG. 1 and depicts an example conceptual diagram illustrating example operations for handling read/write requests after the persistent snapshot.

FIG. 1 and FIG. 2 depicts an example conceptual diagram illustrating example operations for handling read/write requests after a persistent snapshot. FIG. 1 depicts a file system comprising a metadata server 102, client node 108, and client node 110. The metadata server 102 comprises a snapshot generation unit 104 and a metadata database 106. The client node 110 comprises a generation number comparison unit 112, a read/write unit 114, and a client cache 116. The client cache 116 comprises data block mappings 118, data 120, and generation numbers 122A.

A file system enables files and other content to be organized for convenient access, storage, and manipulation. The file system is typically implemented on one or more data storage units (e.g., hard disk) or a file server. To access the content of the file system from a client node (e.g., the client nodes 108 and 110), an operating system of the client node 110 should be aware of a physical location of the content (e.g., files) and a directory with which the content are to be associated. This process is referred to as mounting the file system on the client node 110. For example, the operating system of the client node 110 may be configured to access a set of files from one hard disk and a second set of files from another hard disk. The file system may be mounted (either automatically or by an administrative user) when the client node 110 is booted, when the data storage unit is detected, or on demand. In the file system, physical data blocks (e.g., physical sectors) can be organized into files and directories. The directories of the file system comprise one or more files. Depending on the implementation of the file system, the directories may or may not be hierarchical in that the directories may or may not comprise sub-directories. A clustered file system is simultaneously mounted on multiple client nodes. In FIG. 1, the clustered file system comprises the metadata server 102 and the client nodes 108 and 110 on which the file system is mounted. User applications and processes executing on the client nodes 108 and 110 can access content through the mounted file system via the client nodes 108 and 110. In the clustered file system, the client nodes 108 and 110 perform operations for I/O mapping including writing data to the data storage unit, reading data from the data storage unit, etc. with minimal communication with the metadata server 102. The client nodes 108 and 110 also perform operations for translating file level operations into block level operations. The client nodes 108 and 110 can determine a mapping between logical data blocks and physical data blocks on the data storage unit as depicted by the data block mappings 118 in the client cache 116. For example, on receiving a request for reading a file, the client node 110 may determine that the file comprises logical data blocks 0 and 1. The client node 110 can obtain a data block mapping (also called data block translation) between the logical data blocks 0 and 1 and physical data blocks from the metadata server 102. For example, the metadata server 102 may indicate, to the client node 110, that the data block 0 maps to physical data block 5000 on hard disk 1 and that data block 1 maps to physical data block 5010 on hard disk 2. Thus, in the clustered file system, the client nodes 108 and 110 are aware of data block mapping between the logical data blocks and the physical data blocks. The metadata server 102 is a centralized server that manages and maintains metadata of the file system and communicates with each of the client nodes 108 and 110. The metadata server 102 also determines where (e.g., on which disk) to store the content and keeps track of metadata associated with the content at a fileset, a file, and a data block level. A fileset can be considered as a subset of the file system and can comprise a collection of one or more files that provide a specific function (e.g., files with the same extension). An administrative user can group a set of files together to form a fileset. In some implementations, a directory can be a fileset and all the files under the directory can be considered as a part of the fileset.

At the data block level, the metadata server 102 can maintain metadata associated with each of the data blocks to identify data blocks that are associated with each file, unallocated data blocks, etc. At the file level, the metadata server 102 can maintain metadata associated with each of the files including file name extensions, version numbers, file size (e.g., number of data blocks allocated, number of bytes allocated), a time instant at which the file was modified, a time instant at which a snapshot of the file was created, access permissions (e.g., read only, write, etc.), etc. At the fileset level, the metadata server 102 can maintain metadata to keep track of files that constitute the fileset, a time instant at which files within the fileset were last modified, a time instant at which a snapshot of the fileset was created, access permissions for the fileset, etc. In addition, the metadata server 102 also keeps track of generation numbers associated with each data block, file, and fileset. A generation number is a monotonically increasing number that can be used to identify a particular version or historical copy of content. Creating a snapshot of a file (or a fileset) serves to archive content that constitutes the file (or the fileset). Data blocks, files, and filesets associated with a current generation number are considered to not be archived (or, in other words, to not be part of any previous persistent snapshots).

A persistent snapshot, as described above, is a permanent snapshot that is preserved across rebooting of the client nodes 108, 110 or the metadata server 102 until the persistent snapshot is specifically deleted. The persistent snapshot can be created at the file level or at the fileset level. Stages A-E of FIG. 1 describe operations of the client nodes 108 and 110 for handling a request to create the persistent snapshot. Stages F-H of FIG. 2 describe operations of the client nodes 108 and 110 for handling data access requests after the persistent snapshot.

At stage A, the snapshot generation unit 104 of the metadata server 102 receives a request for creating a persistent snapshot of a fileset. For example, the request for creating the persistent snapshot may be generated in response to a user issuing a command for creating the persistent snapshot of one or more files of the file system. As another example, the request for creating the persistent snapshot may be generated after a pre-determined time interval elapses. As described above, each fileset is associated with a fileset generation number. On receiving the request for creating the persistent snapshot of the fileset, the snapshot generation unit 104 increments the fileset generation number to yield a new fileset generation number. For example, on receiving the request for creating the persistent snapshot of the fileset, the snapshot generation unit 104 can access the metadata database 106, determine that the generation number associated with the fileset is 01, and increment the fileset generation number to yield a new fileset generation number of 02. Any physical data blocks that are associated with a previous fileset generation number are deemed to be part of the persistent snapshot (e.g., part of a "snapshot generation"). Any physical data blocks that are associated with the new fileset generation number are deemed to be created/updated after the snapshot was created and are therefore not part of the snapshot (e.g., are part of a "current generation"). The snapshot generation unit 104 also transmits the new fileset generation number to the client nodes 108 and 110. In one implementation, transmitting the new fileset generation number to the client nodes 108 and 110 can serve as an implicit notification that the persistent snapshot of the fileset is to be created. In another implementation, the snapshot generation unit 104 can transmit a snapshot request identifying the fileset for which the persistent snapshot is to be created and can transmit the new fileset generation number as part of the snapshot request.

At stage B, the client node 110 receives the new fileset generation number that indicates the request for creating the persistent snapshot of the fileset. The client node 112 accesses a previous fileset generation number 122A in the client cache 116 and replaces the fileset generation number 122A by the new fileset generation number 122B. The fileset generation number may be stored as a fileset object in the client cache 116. The fileset generation numbers 122A and 122B can help the client node 110 identify whether content of a particular physical data block was allocated/created/updated after the persistent snapshot was created or whether the content of the physical data block was stored as part of the persistent snapshot. Additionally, in response to receiving the new fileset generation number 122B, the client node 110 ensures that the state of the content of the fileset is current and consistent as will be described in stage C.

At stage C, the read/write unit 114 flushes data 120 from the client cache 116 to a data storage unit (not shown) associated with a clustered file system. The read/write unit 114 flushes the data 120 associated with the fileset for which the snapshot is to be created to the data storage unit. The client cache 116 is a subset of the memory associated with the client node 110 and comprises content that is read from or that is written to the data storage unit for quick access. Reading content involves accessing the data storage unit, reading the content from the data storage unit into the client cache 116, and then copying the content from the client cache 116 to a buffer associated with a requesting process. Writing content involves copying content from the buffer associated with the requesting process to the client cache 116, accessing the data storage unit, and copying the content from the client cache 116 to the data storage unit. In some implementations, the read/write unit 114 may not immediately mirror write requests received from the requesting process to the data storage unit. For example, the read/write unit 114 may perform write operations at predetermined time intervals, after receiving a predetermined number of write requests, etc. In other words, the content of a physical data block of the data storage unit may be different from the content of the physical data block as indicated in the client cache 116. Such data that is stored in the client cache 116 but is not yet mirrored to the data storage unit is also referred to as "dirty data" 120. In one implementation, the read/write unit 114 can flush the dirty data 120 to the data storage unit (i.e., sync the client cache 116 with the data storage unit) at periodic intervals. In another implementation, the read/write unit 114 can flush the dirty data 120 from the client cache 116 to the data storage unit in response to receiving the new generation number 122B and the snapshot request from the metadata server 102. The physical data blocks that are updated as a result of flushing the dirty data 120 from the client cache 116 to the data storage unit are associated with the previous fileset generation number 122A and are part of the snapshot generation.

At stage D, the client node 110 transmits metadata associated with the dirty data 120 to the metadata server 102. As part of the metadata associated with the dirty data 120, the read/write unit 114 can indicate that the content of the client cache 116 has been written to the allocated physical data blocks. For example, the metadata server 102 may allocate physical data block 0 to enable the read/write unit 114 to write content generated by an application. However, the read/write unit 114 may not persistently write the content to the physical data block 0. In other words, as described earlier, the read/write unit 114 may indicate, as part of the metadata in the client cache 116, that the content is to be written to the physical data block 0 without writing the content to the data storage unit. After the read/write unit 114 flushes the dirty data 120 to the data storage unit, the read-write unit 114 can indicate whether content is written to allocated physical data blocks, whether content is deleted from allocated physical data blocks, whether previously allocated physical data blocks can be de-allocated, etc. For example, the read/write unit 114 may indicate that content has been written to the physical data block 0, that the physical data block 0 is associated with file "abc.txt", which is part of the fileset "fileset_1". After the read/write unit syncs the client cache 116 with the data storage unit and transmits the metadata associated with the dirty data 120 to the metadata server 102, the client node 110 transmits a notification to the metadata server 102 indicating that the state of the content of the fileset is current. In other words, the client node 110 indicates that the content in the data storage unit is consistent with the content in the client cache 116 and that all previously received write requests have been mirrored to the data storage unit. In some implementations, the client node 110 transmitting the metadata associated with the dirty data 120 to the metadata server 102 can serve as an indication that the content in the data storage unit is consistent with the content in the client cache 116. It is noted that although the read/write unit 114 flushes the client cache 116 to the data storage unit to have a consistent image of the state of the file system when the snapshot was requested (e.g., to ensure that data blocks associated with the previous generation number 122A are consistent across the client nodes 108 and 110), the client node 110 may not completely erase the client cache 116. The client node 110 may maintain data block mappings 118 that identify logical data blocks associated with individual files of the mounted file system, physical data blocks that map to the logical data blocks, a generation number associated with each logical data block, etc.

At stage E, the snapshot generation unit 104 creates the persistent snapshot of the fileset. On receiving the metadata associated with the dirty data 120 from the client node 110, the metadata server 102 can update the metadata database 106. For example, on receiving a notification that content has been written to a physical data block 0, the metadata server 102 can update a flag associated with the physical data block and can mark the physical data block as "used" or "allocated" in a file metadata tree. As another example, on receiving a notification that content has been deleted from a physical data block 05, the metadata server 102 can update a flag associated with the physical data block 05 and can mark the physical data block as "free" or "unallocated". After the snapshot generation unit 104 receives a response from all the client nodes 108 and 110 indicating that the previously received write requests have been mirrored to the data storage unit and that the state of the data storage unit is current, the snapshot generation unit 104 creates the persistent snapshot of the fileset.

At stage F in FIG. 2, in response to a request to read content ("read request"), the read/write unit 114 identifies a physical data block to be read based on the data block mappings 118 from the client cache 116. For example, the read/write unit 114 may receive a read request from an application to read content of file file_0. The read/write unit 114 can access the data block mappings 118 from the client cache 116 and can determine whether a data block mapping for the file file_0 exists in the client cache 116. In FIG. 2, the read/write unit 114 determines that the file file_0 maps to logical data blocks represented by logical block number (LBN) LBN 0 and LBN 1. The read/write unit 114 can use these data block mappings 118 to identify the physical data blocks from which the content of the file file_0 can be accessed. In FIG. 2, the read/write unit 114 determines that the logical data block LBN 0 maps to the physical data block 5000 on the data storage unit and that the logical data block LBN 1 maps to the physical data block 6000 on the data storage unit. Accordingly, the read/write unit 114 can access the appropriate physical data blocks and can provide the content of the physical data blocks to the application. The physical data block may be associated with a block generation number that maps to the snapshot generation if the physical data block is not updated in the current generation. The physical data block may be associated with a block generation number that maps to the current generation if the physical data block has been updated in the current generation (as will be described below).

At stage G, in response to a request to update content of a physical data block, the generation number comparison unit 112 compares a block generation number of the physical data block against a current fileset generation number (in this case, the stored new fileset generation number 122B) associated with the physical data block. The snapshot generation and the current generation share the same physical data block until a first write request to modify the physical data block is received. Therefore, prior to updating the content of the physical data block, the generation number comparison unit 112 determines whether the physical data block is part of the snapshot generation or is part of the current generation. The generation number comparison unit 112 accesses a block generation number structure 124A of the client cache 116 to determine the block generation number associated with the logical data block that is to be updated. In FIG. 2, the generation number comparison unit 112 determines that the block generation number associated with the logical data block LBN 0 is 01 and that the block generation number associated with the logical data block LBN 1 is 03. In other words, the generation number comparison unit 112 determines that the physical data block that currently maps to the logical data block LBN 0 is part of the snapshot generation while the physical data block that maps to the logical data block LBN 1 is part of the current generation. If the generation number comparison unit 112 determines that the physical data block to be updated is part of the current generation (e.g., if the logical data block LBN 1 is to be updated), the read/write unit 114 executes operations as will be described in stage H2. If the generation number comparison unit 112 determines that physical data block to be updated is part of the snapshot generation (e.g., if the data block LBN 0 is to be updated), the read/write unit 114 executes operations as will be described in stage H1.

At stage H1, the read/write unit 114 requests a new physical data block to which to update the content of the physical data block, if the block generation number is less than or equal to the current fileset generation number 122B. A first write request (after the persistent snapshot is created) directed to a logical data block results in the block generation number of the logical data block being less than or equal to the current fileset generation number 122B. As depicted in FIG. 2, the block generation number (e.g., 01) of the logical data block LBN 0 is less than the current fileset generation number (e.g., 02). This indicates that the physical data block that currently maps to the logical data block LBN 0 belongs to the snapshot generation and that content of the physical data block is to be preserved (as part of the snapshot). Therefore, the read/write unit 114 determines that the physical data block (e.g., the data block 5000 as depicted in the data block mapping 118B) that maps to the physical data block that maps to the logical data block LBN 0 ("previous data block") cannot be updated in accordance with the write request. The read/write unit 114 transmits a block allocate request to the metadata server 102. The metadata server 102 allocates a new physical data block (e.g., data block 6100) to the read/write unit 114 and associates the logical data block LBN 0 with a new block generation number that is greater than the current fileset generation number 122B. The read/write unit 114 writes content to the new physical data block in accordance with the write request and updates the block generation number associated with LBN 0. In other words, the read/write unit 114 executes operations for redirect-on-write on determining that the previous data block to be updated belongs to the snapshot generation. As depicted in a block generation number structure 124B, the block generation number associated with LBN 0 is updated from 01 to 03. The block generation number structure 124B represents the state of the block generation number structure 124A after the metadata server 102 allocates a new physical data block for servicing the write request. Also, as depicted by data block mappings 118C, the read/write unit 114 updates the client cache 116 so that the logical data block LBN 0 maps to the new physical block 6100 allocated by the metadata server 102. Any subsequent write requests to LBN 0 will result in an update of the physical data block 6100. In some implementations, the read/write unit 114 can update access permissions associated with the previous data block (i.e., the physical data block 5000). For example, the read/write unit 114 can update a flag associated with the previous data block to change access permissions from "write" to "read-only". In other implementations, the metadata associated with the logical data block LBN 0 can be updated to map to the physical data block 6100 and to delete the mapping to the physical data block 5000, precluding the need for updating access permissions, At stage H2, the read/write unit 114 updates the physical data block in accordance with the write request if the block generation number is greater than the current fileset generation number 122B. If the generation number comparison unit 112 determines that the block generation number associated with the logical data block referenced by the write request is greater than the current fileset generation number 122B, the read/write unit 114 can update the physical data block that maps to the logical data block in place. In FIG. 2, the data block mappings 118B indicate that a new physical data block that maps to the logical data block LBN 1 was allocated in response to a write request (not shown) after the persistent snapshot. Therefore, the data block mappings 118B reflect a state of the data block mappings that is different from the data block mappings 118A. On receiving a subsequent request to write/update the logical data block LBN 1, the generation number comparison unit 112 accesses the block generation number structure 124A and determines the block generation number (e.g., 03) associated with the logical data block LBN 1. The generation number comparison unit 112 determines that the block generation number associated with LBN 1 is greater than the current fileset generation number 122B (e.g., 02). This indicates that the physical data block that maps to the logical data block LBN 1 is not of the snapshot generation and, therefore, can be updated. The read/write unit 114 accesses data block mappings 118B from the client cache 116 and determines that the logical block LBN 1 maps to the physical data block 6000. The read/write unit 114 updates the content of the physical data block 6000 in accordance with the write request. In other words, the read/write unit 114 executes operations for update-in-place on determining that the physical data block to be updated does not belong to the snapshot generation.

It is noted that although FIGS. 1-2 describe operations for comparing the block generation number with the fileset generation number to determine whether to execute operations for redirect-on-write or update-in-place, embodiments are not so limited. In some implementations, a persistent snapshot of a single file may be created and a new file generation number may be determined while the fileset generation number of the fileset that comprises the file may not be updated. Consequently, the fileset generation number may reflect the snapshot generation while the new file generation number may reflect the current generation. On receiving a write request, it may be determined whether the logical data block for which the write request is received is associated with the file for which the persistent snapshot was created or is associated with another file (for which a persistent snapshot was not created) in the fileset. For this, the generation number comparison unit 112 can access a current file generation number (in this case, the new file generation number) associated with the file to which the logical data block belongs and can also access a current fileset generation number associated with the fileset to which the file belongs. The generation number comparison unit 112 can determine a greater of the current file generation number and the current fileset generation number as a target generation number. The generation number comparison unit 112 can compare the block generation number against the target generation number. As described above, if the block generation number is greater than the target generation number, the read/write unit 114 performs update-in-place operations, while if the block generation number is less than or equal to the target generation number, the read/write unit 114 performs redirect-on-write operations. Additionally the generation numbers can be used to determine, at the client node, whether a physical data block of a clone file or a clone fileset was inherited. Redirect-on-write operations may be executed for the inherited physical data blocks to preserve the original identity/content of the physical data blocks.

Figure 3:
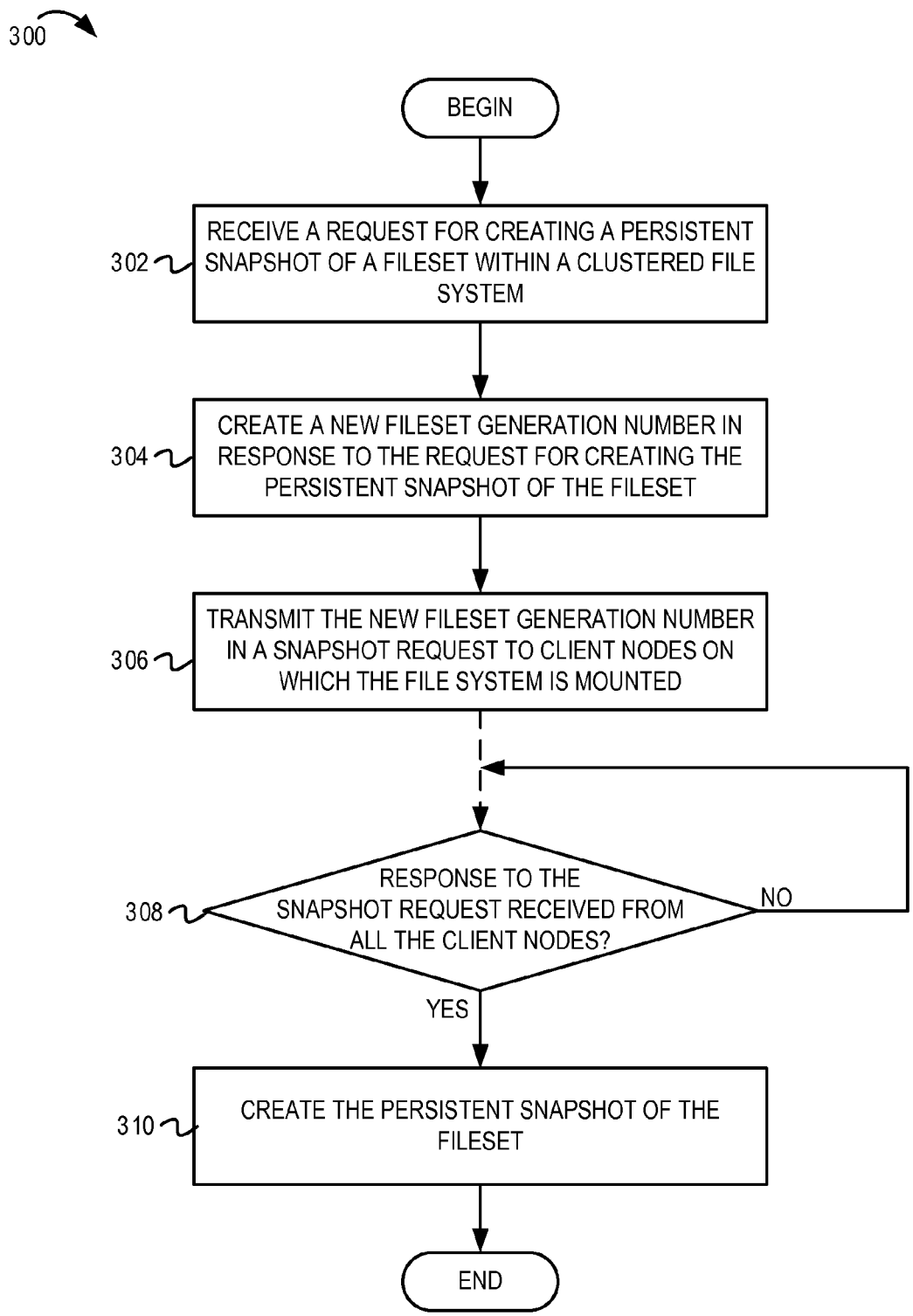
FIG. 3 is a flow diagram illustrating example operations of a server creating a persistent snapshot.

FIG. 3 is a flow diagram illustrating example operations of a server creating a persistent snapshot. Flow 300 begins at block 302.

A request for creating a persistent snapshot of a fileset within a clustered file system is received (302). A metadata server (e.g., the metadata server 102 of FIG. 1) can receive and process the request for creating the persistent snapshot of the fileset. The request to the metadata server 102 can comprise a fileset identification number to identify the fileset for which the persistent snapshot is to be created. The flow continues at block 304.

A new fileset generation number is created in response to the request for creating the persistent snapshot of the fileset (304). Fileset generation numbers can be used to keep track of whether a persistent snapshot of the fileset has previously been created. On receiving the request for creating the persistent snapshot of the fileset, the metadata server 102 creates the new fileset generation number. A previous fileset generation number is then associated with the persistent snapshot of the fileset that is to be generated. Thus, content (i.e., physical data blocks and files) associated with the previous fileset generation number is deemed to be part of the snapshot generation and is not updated to maintain integrity of the persistent snapshot of the fileset. Because the fileset generation number is updated when a new persistent snapshot of the fileset is created, the fileset generation number can be used to identify whether a physical data block that constitutes the fileset is old data (i.e., data that is part of a previous persistent snapshot) or current data (i.e., data that has not been stored in a previous persistent snapshot). The flow continues at block 306.

The new fileset generation number is transmitted in a snapshot request to client nodes on which the file system is mounted (306). In some implementations, transmitting the new fileset generation number can serve as an indication that the persistent snapshot of the fileset is to be created. On receiving the new fileset generation number and/or the snapshot request, the client nodes can update a fileset object on the respective client nodes to discard the previous fileset generation number and to store the new fileset generation number. In addition, the client nodes can also flush dirty data from their respective client caches to a data storage unit to ensure consistency of the fileset for which the persistent snapshot is to be created, as was described in FIG. 1 and as will be described in FIG. 4. The flow continues at block 308.

It is determined whether a response to the snapshot request is received from the one or more client nodes (block 308). Dashed connecting lines between the block 306 and the block 308 indicate that operations of block 308 are performed in response to a response from the client nodes. As described above, on receiving an indication that the persistent snapshot of the fileset is to be created, the client nodes execute a set of operations (as will be described in FIG. 4) to ensure currency of the content of the fileset. Each client node, on completing execution of the set of operations, notifies the metadata server (e.g., as a response to the snapshot request) that a client cache of the client node is synced with the data storage unit. Before the persistent snapshot of the fileset can be created, it should be determined whether client caches associated with each client node of the clustered file system are synced with the data storage unit. If it is determined that the response to the snapshot request is received from all the client nodes, the flow continues at block 310. Otherwise, the flow loops back to block 308, where the metadata server waits for all the client nodes to flush their respective client cache to the data storage unit and to indicate currency of the file system.

The persistent snapshot of the fileset is created (310). The persistent snapshot can be addressed through a user-supplied handle. Furthermore, content that constitutes the persistent snapshot may be accessed concurrently with current content of the clustered file system. From block 310, the flow ends.

It is noted that although FIG. 3 depicts operations for creating the persistent snapshot of a fileset, in other embodiments, a persistent snapshot of an individual file may also be created. For this, a new file generation number may be created in response to receiving a request for creating a persistent snapshot of the file. The new file generation number may be provided to the client nodes. In some implementations, the client nodes may identify and may only flush dirty data that is associated with the file for which the persistent snapshot is to be created. In another implementation, the client nodes may flush all the dirty data from their respective client caches to the data storage unit.

It is noted that although FIG. 3 depicts the metadata server waiting until all the client nodes transmit a response to the snapshot request by flushing their respective client cache and indicating currency of the file system (block 308), embodiments are not so limited. In other embodiments, the metadata server may wait for a pre-determined time interval to receive the response to the snapshot request from each of the client nodes. The pre-determined time interval may be based on the number of client nodes, the size of client caches, communication technology used (e.g., for 802.11 communication standards, a back-off interval for communication medium access to prevent collisions may be taken into consideration). The metadata server may create the persistent snapshot of the fileset after the pre-determined time interval expires.

Figure 4:
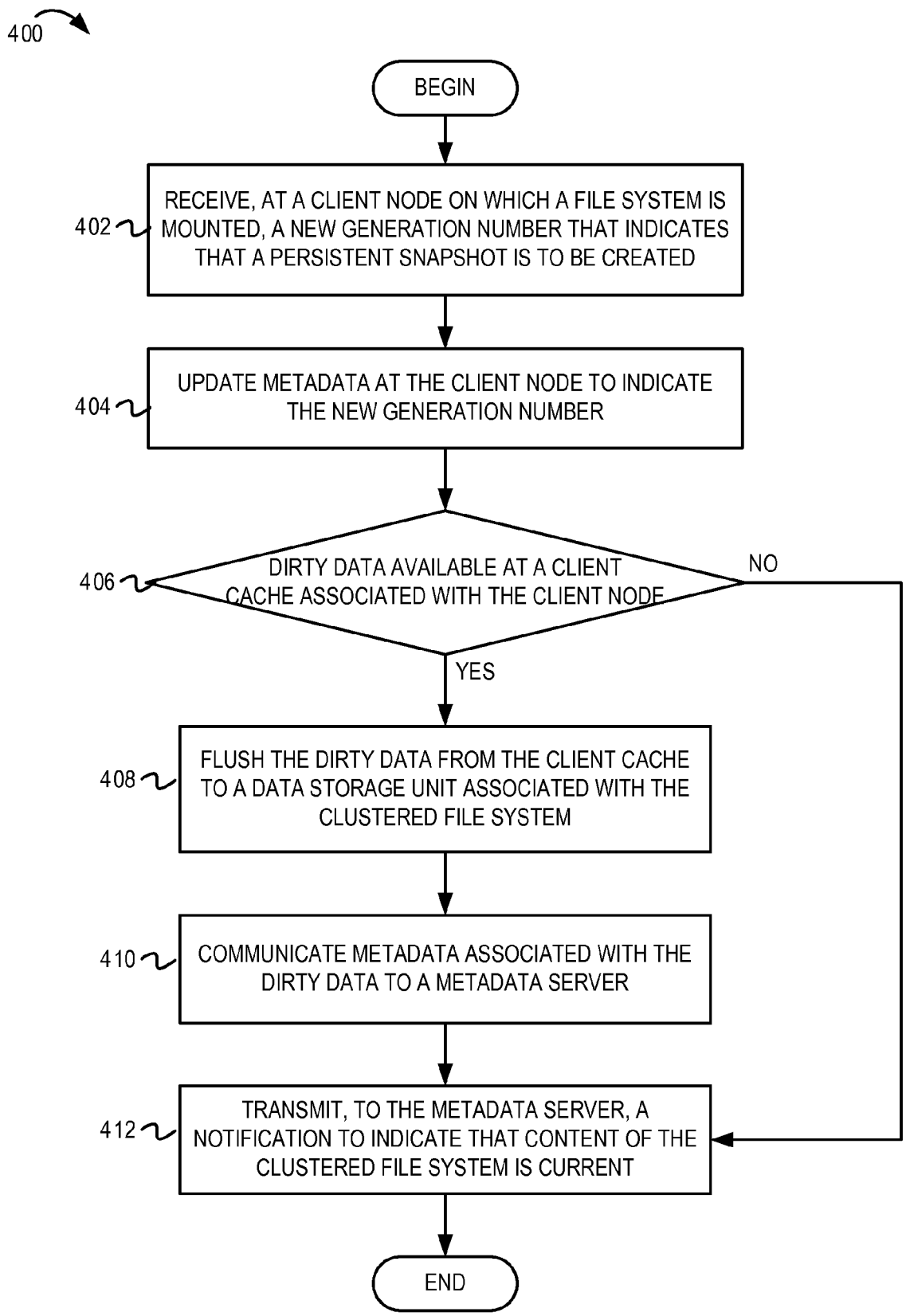
FIG. 4 is a flow diagram illustrating example operations of a client node for maintaining consistency of content for which a persistent snapshot is to be created.

FIG. 4 is a flow diagram illustrating example operations of a client node for maintaining consistency of content for which a persistent snapshot is to be created. Flow 400 begins at block 402.

A new generation number that indicates that a persistent snapshot is to be created is received at a client node on which a file system is mounted (402). For example, a metadata server can create the new generation number and can provide the new generation number to the client node. If a persistent snapshot of a file is to be created, the client node may receive a new file generation number associated with the file. If a persistent snapshot of a fileset is to be created, the client node may receive a new fileset generation number associated with the fileset. The flow continues at block 404.

Metadata at the client node is updated to indicate the new generation number (404). On receiving the new fileset generation number, the client node can update a fileset object associated with the fileset to replace a previous fileset generation number by the new fileset generation number. On receiving the new file generation number, the client node can update a file object associated with the file to replace a previous file generation number by the new file generation number. The new generation number can be used to determine whether content is part of a snapshot generation that is not to be modified to maintain integrity of the persistent snapshot. The flow continues at block 406.

It is determined whether dirty data is available at a client cache associated with the client node (406). On receiving a write request, the client node may not immediately mirror the write request to corresponding physical data blocks on a data storage unit. Instead, the client node may store the write request in the client cache or may update/write the content to the client cache in accordance with the write request. For example, on receiving a request to delete a physical data block, the client node may mark the physical data block as deleted in the client cache without accessing the data storage unit, deleting the content of the physical data block, and indicating to the metadata server that the physical data block can be de-allocated. The presence of dirty data in the client cache indicates that the content of the file system is not consistent with the client cache. If it is determined that dirty data is available at the client cache associated with the client node, the flow continues at block 408. Otherwise, the flow continues at block 412.

The dirty data is flushed from the client cache to the data storage unit associated with the clustered file system (408). Various synchronization techniques can be implemented to sync the client cache with the data storage unit. Prior to writing the dirty data from the client cache to a physical data block in the data storage unit, the client node can determine whether a physical data block is allocated for the dirty data in the client cache. If so, the client node can write the dirty data from the client cache to the corresponding physical data block in the data storage unit. Otherwise, the client node can transmit a block allocate request to the metadata server, write the dirty data to the physical data block allocated by the metadata server, and store an appropriate data block mapping in the client cache. It is noted that the physical data blocks that are updated as a result of flushing the client cache to the data storage unit are deemed to be part of the snapshot generation. The flow continues at block 410.

Metadata associated with the dirty data is communicated to a metadata server (410). For example, the client node may indicate physical data blocks to which the dirty data has been written, updated data block mappings (if any), whether content is deleted from allocated physical data blocks, whether previously allocated physical data blocks can be de-allocated, etc. The flow continues at block 412.

A notification is transmitted to the metadata server indicating that content of the clustered file system is current (412). After the client node flushes the dirty data from the client cache 116 to the data storage unit and transmits the metadata associated with the dirty data to the metadata server, the client node can transmit the notification indicating currency of the content of the file system. In other words, the client node can indicate that all previously received write requests have been mirrored to the data storage unit. However, the client node may not delete data block mappings that represent a relationship between logical data blocks and physical data blocks of the data storage unit. As described above, the metadata server can create the persistent snapshot on receiving the notification of block 412 from all the client nodes on which the file system is mounted. From block 412, the flow ends.

Figure 5:
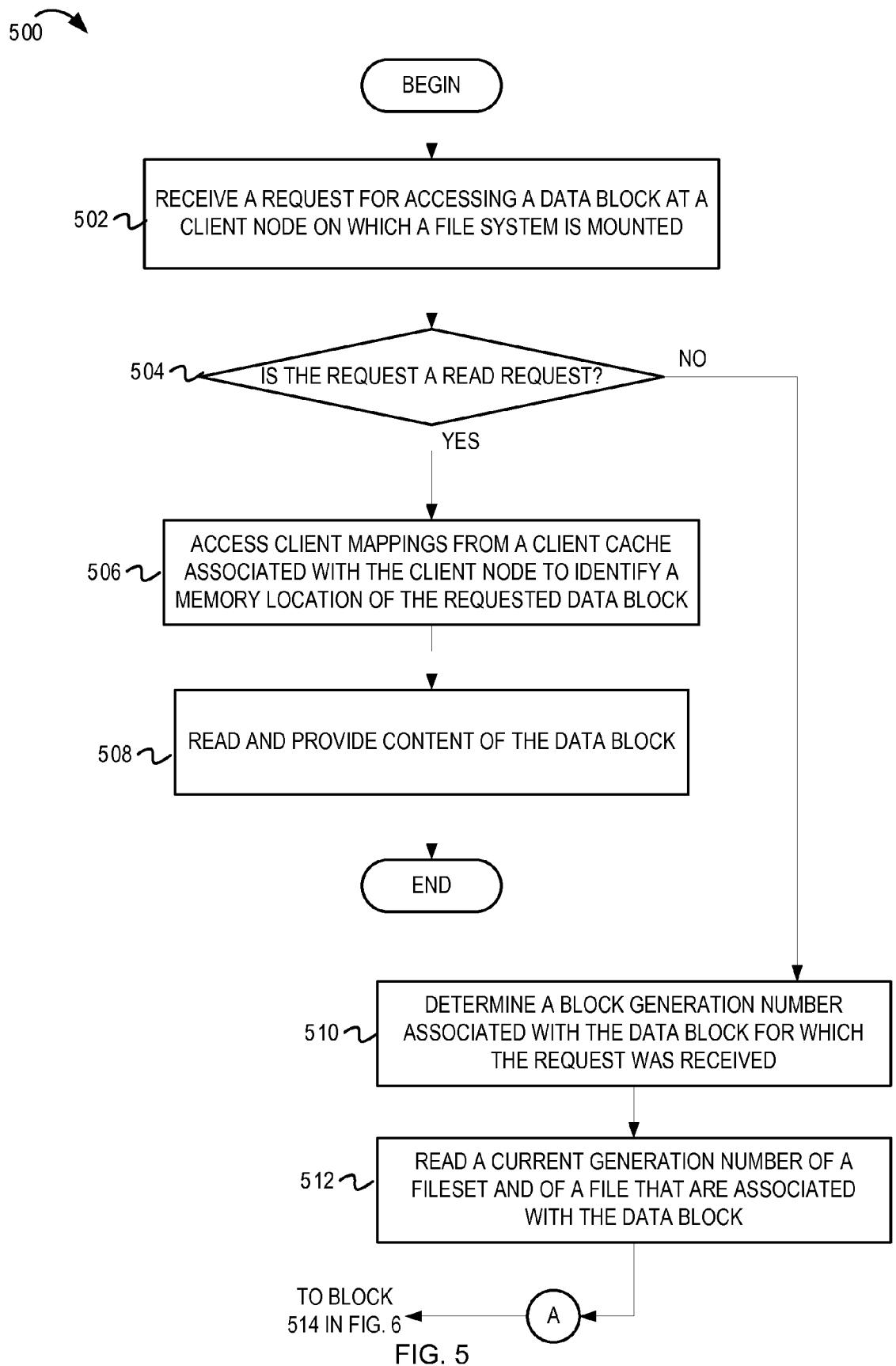
FIG. 5 depicts a flow diagram illustrating example operations for handling read requests following a persistent snapshot.
Figure 6:
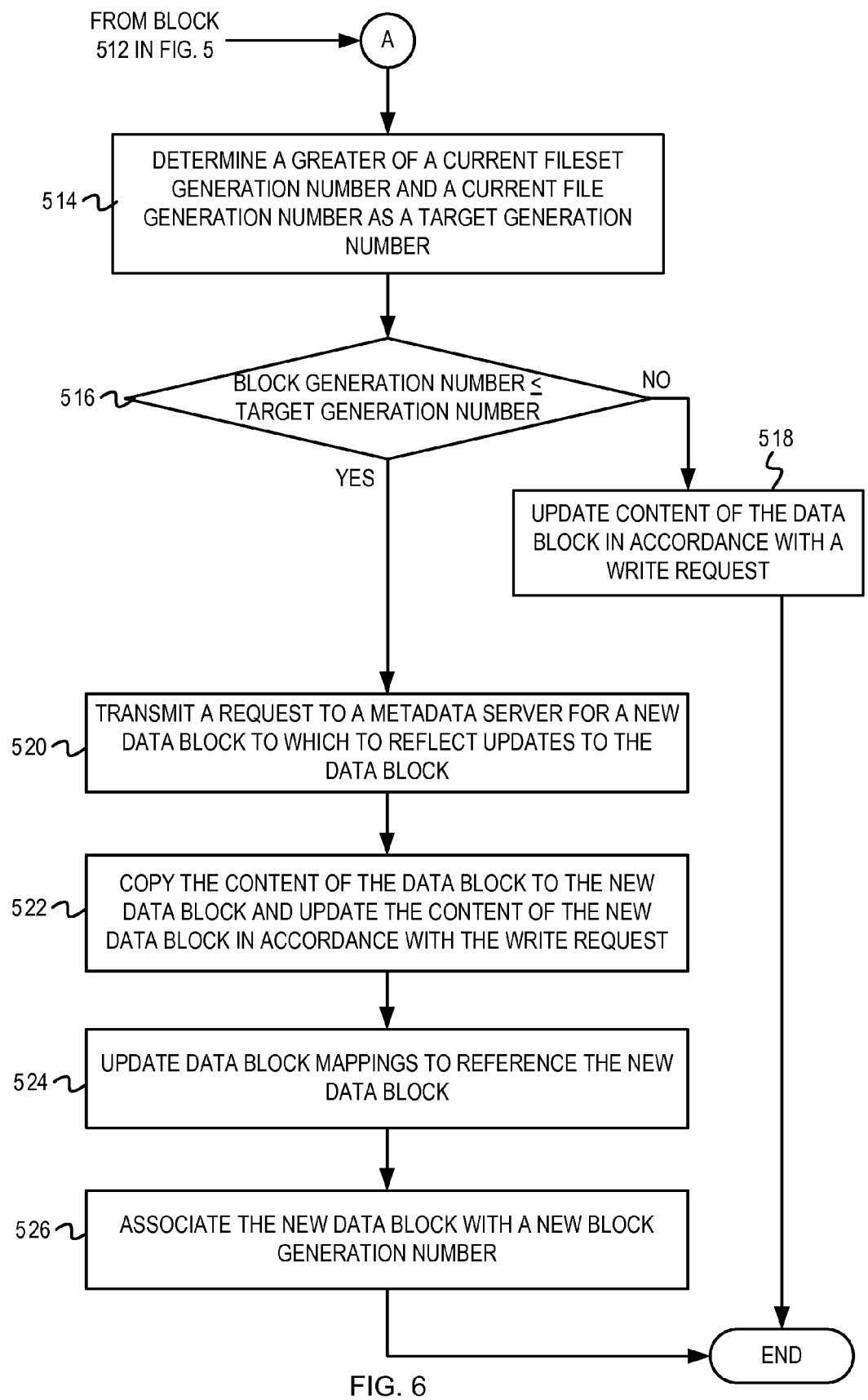
FIG. 6 is a continuation of FIG. 5 and illustrates example operations for handling write requests following a persistent snapshot.

FIG. 5 and FIG. 6 depict a flow diagram illustrating example operations for handling read/write requests following a persistent snapshot. Flow 500 begins at block 502 in FIG. 5.

A request for accessing a data block is received at a client node on which a file system is mounted (502). The request for accessing a data block may be received from a process or a user application. In some implementations, the client node may receive a request to access file (e.g., to read file abc.txt or to write to file abc.txt). The client node may identify one or more logical data blocks associated with the file to be accessed. For example, the client node may determine that the file abc.txt is associated with logical data blocks 100, 101, and 102. The flow continues at block 504.

It is determined whether the received request is a read request (504). The request received at the client node may be to read one or more physical data blocks from a data storage unit to an application buffer or to write content from the application buffer to one or more physical data blocks of the data storage unit. If it is determined that the received request is a read request, the flow continues at block 506. If it is determined that the received request is a write request, the flow continues at block 510.

Data block mappings are accessed from a client cache associated with the client node to identify a memory location of the requested data block (506). The flow moves from block 504 to block 506 on receiving a read request. The client node can access cached data block mappings to identify physical data blocks to which logical data blocks to be accessed are mapped. For example, the client node may determine that a file to be read comprises logical data blocks 100, 101, and 102. The client node can access the cached data block mappings and can determine that the logical data blocks 100, 101, and 102 map to physical data blocks 5000, 5010, and 5100 respectively in the data storage unit. The flow continues at block 508.

Content of the data block is read and is provided to a requesting process (508). With reference to the example of block 506, on determining that the logical data blocks 100, 101, and 102 map to physical data blocks 5000, 5010, and 5100 respectively, the client node can access the physical data blocks 5000, 5010, and 5100 to read the requisite content. The client node can then provide the content to the process that requested the content. From block 508, the flow ends.

A block generation number associated with the logical data block for which the request was received is determined (510). The flow moves from block 504 to block 510 on receiving a request to write data to a physical data block that currently maps to the logical data block for which the write request was received. A block generation number structure (e.g., in the client cache) can be accessed to identify the block generation number associated with the logical data block. For example, based on receiving the write request, it may be determined that content of logical data block 500 is to be updated. It may be determined that physical data block 2000 maps to the logical data block 500. The block generation number structure may be accessed to determine the block generation number of the 500. The block generation number can be used to determine whether content of the physical data block (that currently maps to the logical data block for which the write request was received) to be updated is part of the snapshot generation. The flow continues at block 512

A current generation number of a fileset and a current generation number of a file that are associated with the logical data block are read (512). For example, the client cache can be accessed to identify the file that comprises the logical data block and the fileset to which the file that comprises the logical data block belongs. Accordingly, a current file generation number of the file that comprises the logical data block and a current fileset generation number of the fileset that comprises the file can be determined. The flow continues at block 514 in FIG. 6.

A greater of the current fileset generation number and the current file generation number is determined as a target generation number (514). Because a snapshot can be created at the file level or at the fileset level, an update to the file generation number may not be reflected in the fileset generation number and vice versa. By determining the greater of the current file generation number and the current fileset generation number, it can be determined whether the logical data block belongs to a snapshot generation of the file and/or the fileset associated with the logical data block. The flow continues at block 516.

It is determined whether the block generation number is less than or equal to the target generation number (516). The block generation number is compared against the target generation number. The block generation number being less than or equal to the target generation number can indicate that the logical data block is part of the snapshot generation. Accordingly, the physical data block that maps to the logical data block may not be updated. The block generation number being greater than the target generation number can indicate that the logical data block is not part of the snapshot generation. Accordingly, the physical data block that maps to the logical data block may be updated in place. If it is determined that the block generation number is less than or equal to the target generation number, the flow continues at block 520. Otherwise, the flow continues at block 518.

A request for a new data block to which to reflect updates to the physical data block is transmitted to a metadata server (520). The flow 500 moves from block 516 to block 520 on determining that the block generation number is less than or equal to the target generation number. The block generation number being less than or equal to the target generation number can indicate that the physical data block is associated with a block generation number of the snapshot generation and that the physical data block should not be modified in the current generation. In other words, after the persistent snapshot is created, the physical data block is shared between the snapshot generation and the current generation. To preserve the content of the snapshot generation, the client node can transmit a block allocate request to the metadata server to request allocation of a new physical data block for servicing the write request. In some implementations, the client node may update access permissions associated with the physical data block ("previous physical data block") from read/write access permissions to read-only access permissions. The flow continues at block 522.

The content of the previous physical data block is copied to the new data block and the content of the new data block is updated in accordance with the write request (522). The flow continues at block 524.

The data block mappings are updated to reference the new physical data block (524). The client node can update the data block mappings in the client cache to indicate that the logical data block for which the write request was received maps to the new physical data block allocated by the metadata server. Any subsequent requests to access the logical data block will result in the new physical data block being accessed. For example, with reference to FIG. 2, the physical data block 5000 was originally mapped to the logical data block LBN 1. After the persistent snapshot was created, the new physical data block 6000 was allocated for servicing a write request directed to the logical data block LBN 1. The data block mapping 118C are updated to reflect that the logical data block LBN 1 now maps to the physical data block 6000. Subsequent requests to access the logical data block LBN 1 will result in the physical data block 6000 being accessed. Additionally, the client node can also update the block generation number structure to store a new block generation number associated with the logical data block LBN 1. The flow continues at block 526.

The logical data block for which the write request was received is associated with the new block generation number (524). The new block generation number may be greater than the target generation number. This can be to ensure that any subsequent write requests directed to the new physical data block prior to another snapshot request are updated in place without allocating another new physical data block for the write request. For example if the target generation number is 03, the new block generation number may be 04. Typically, the metadata server can generate the new block generation number based on knowledge of the file generation number associated with the file with which the logical data block is associated and based on knowledge of the fileset generation number to which the file belongs. The metadata server can communicate the new block generation number to the client node when the metadata server allocates the new physical data block to the client node. In other implementations, however, the client node can determine the new block generation number and can communicate the new block generation number to the metadata server. From block 526, the flow ends.

Content of the physical data block is updated in accordance with the write request (518). The flow 500 moves from block 516 to block 518 on determining that the block generation number is greater than the target generation number. The block generation number of the logical data block (for which the write request is received) being greater than the target generation number can indicate that the corresponding physical data block is not part of the snapshot generation and is instead of the current generation (i.e., content of the data has not been captured in the snapshot). Therefore, the client node can update the content of the physical data block in accordance with the write request (e.g., write data, delete data, append data, etc.). From block 518, the flow ends.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
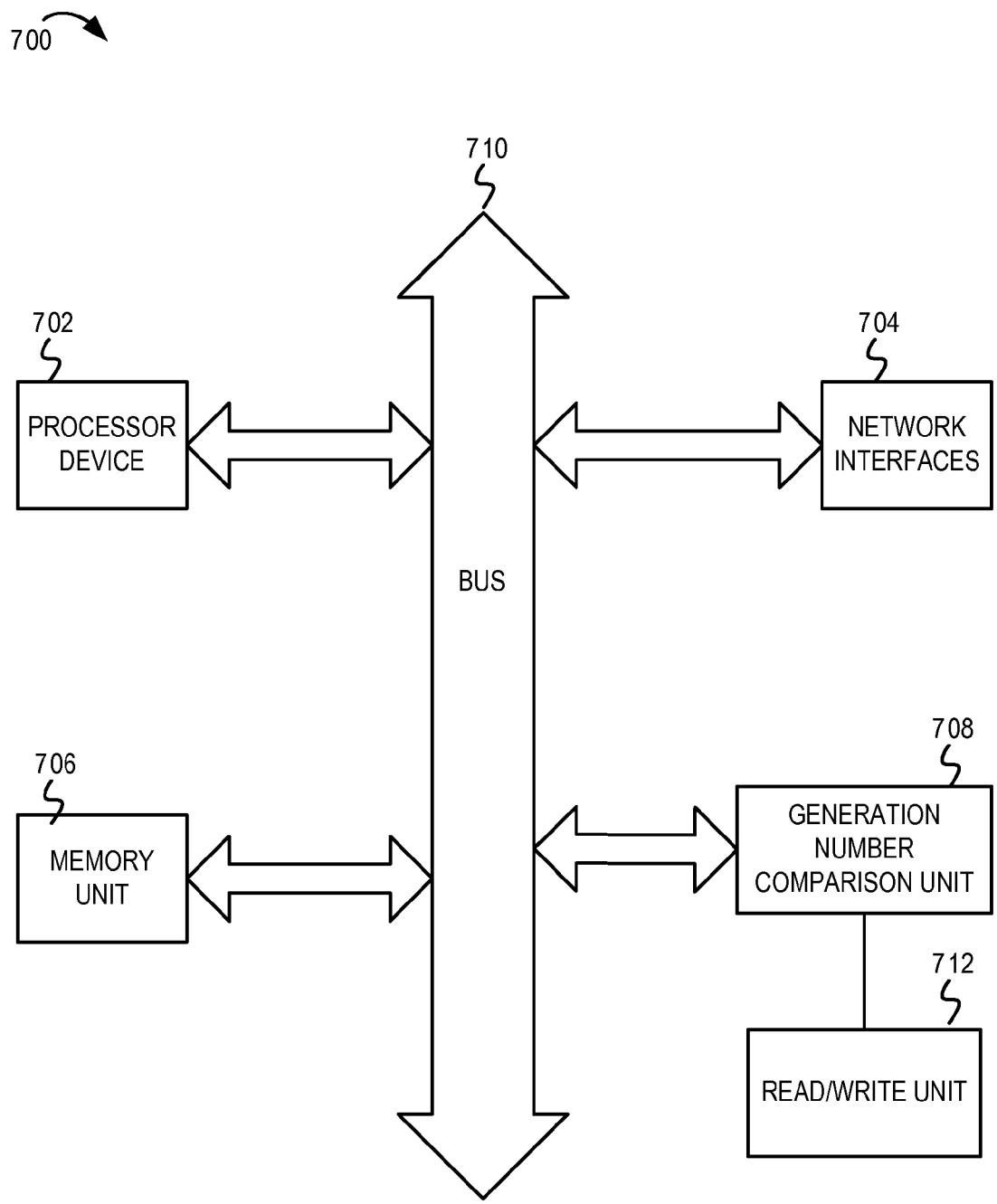
FIG. 7 is a block diagram of one embodiment of a computer system including a mechanism for handing requests to access content after a persistent snapshot.

FIG. 7 is a block diagram of one embodiment of a computer system 700 including a mechanism for handing requests to access content after a persistent snapshot. The computer system may be a personal computer, a laptop, a server, or other machine on which a file system can be mounted. The computer system 700 includes a processor unit 702 (possibly including multiple processors, multiple cores, multiple nodes, and/or implementing multi-threading, etc.). The computer system 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 700 also includes a bus 710 (e.g., PCI, ISA, PCI-Express, HyperTransport®, Infini-Band®, NuBus, AHB, AXI, etc.), and network interfaces 704 that include at least one wireless network interface (e.g., a WLAN interface, a Bluetooth® interface, a WiMAX interface, a ZigBee® interface, a Wireless USB interface, etc.).

The computer system 700 also includes a generation number comparison unit 708 and a read/write unit 712. As described with reference to FIGS. 1-2 and 4-6, the computer system 700 receives a new generation number of a fileset (or file) for which a snapshot is to be created and stores the new generation number in a client cache. The read/write unit 712 flushes dirty data from the client cache to a data storage unit and transmits metadata associated with the dirty data to a metadata server. Responsive to a read request, the read/write unit 712 identifies a physical data block to be read based on cached data block mappings. Responsive to a write request, the generation number comparison unit 708 compares a block generation number (of a logical data block referenced by the write request) with a current generation number of the file associated with the logical data block and a current generation number of the fileset to which the file belongs to determine whether the data block can be updated. If so, the read/write unit 712 can update a physical data block that maps to the logical data block in place in accordance with the write request. Otherwise, the read/write unit 712 can service the write request at a new physical data block.

In some embodiments, the computer system 700 can include additional devices and/or more than one of each component shown in FIG. 7 (e.g., video cards, audio cards, peripheral devices, etc.). For example, in some instances, the computer system 700 may include multiple processor units, multiple cores, multiple external CPU's. In other instances, components may be integrated or subdivided. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.).

Figure 8:
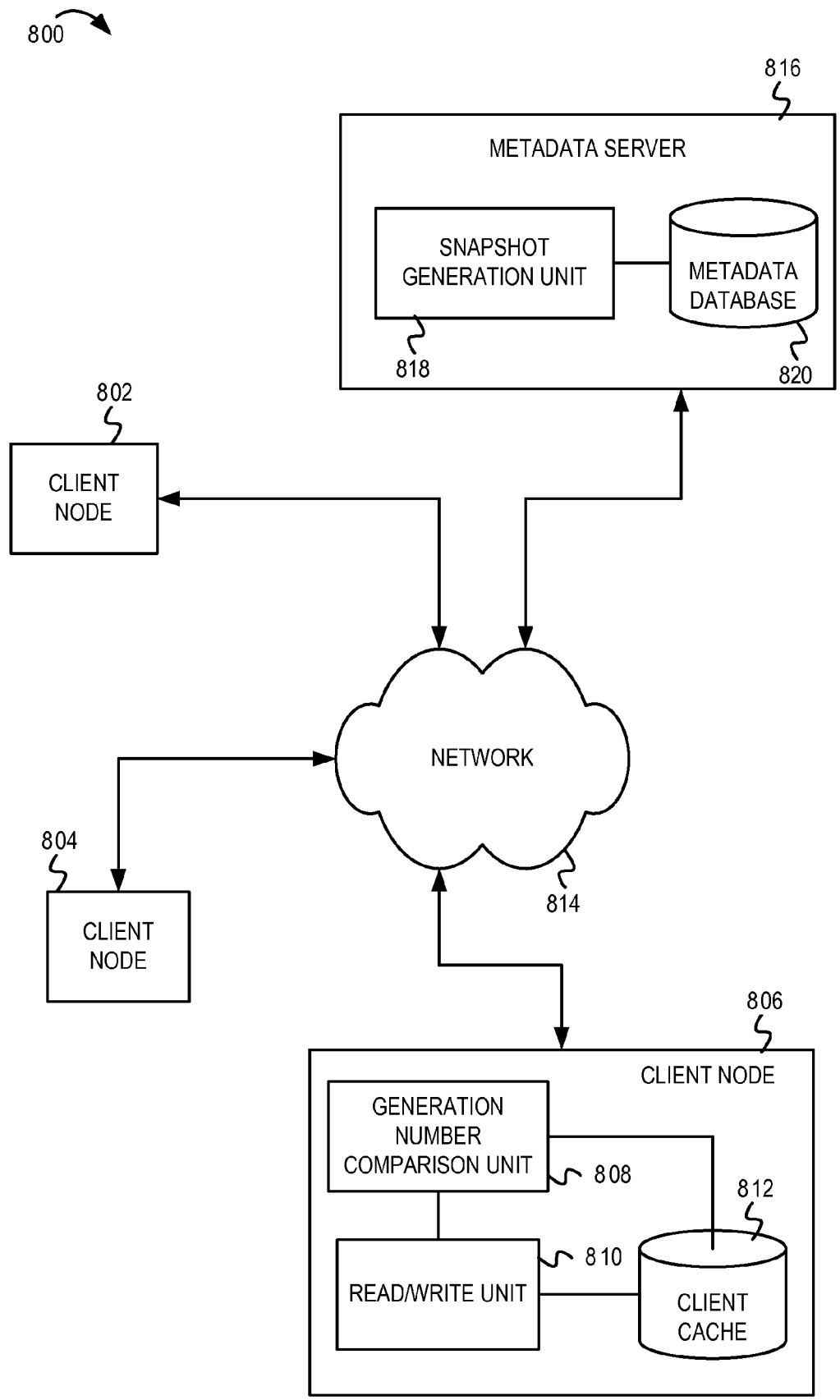
FIG. 8 is an example block diagram illustrating a system configured for servicing read/write requests after creating a persistent snapshot.

FIG. 8 is an example block diagram illustrating a system 800 configured for servicing read/write requests after creating a persistent snapshot. The system 800 comprises a metadata server 816, a client node 802, a client node 804, and a client node 806. The metadata server 816 comprises a snapshot generation unit 818 coupled with a metadata database 820. Each of the client nodes 806 comprise a generation number comparison unit 808, a read/write unit 810, and a client cache 812. It is noted that in some implementations, a client node and a server may be implemented on a single physical machine. For example, the physical machine may execute a client instance and a server instance.

The snapshot generation unit 818 of the metadata server 816 receives a request for creating a persistent snapshot of a fileset (or a file). The snapshot generation unit 818 generates a new generation number associated with the fileset (or the file) and communicates the new generation number to the client nodes 802, 804, and 806 in a snapshot request. Each of the client nodes 806 store the new generation number in their respective client cache 812. Responsive to receiving the new generation number, the read/write unit 810 writes dirty data from the client cache 812 to a data storage unit (not shown) and transmits metadata associated with the dirty data to the metadata server 816. On receiving a response to the snapshot request from all the client nodes 802, 804, and 806, the snapshot generation unit 818 creates the persistent snapshot of the fileset (or the file). The read/write unit 810 identifies a physical data block to be read based on data block mappings previously stored in the client cache 812 responsive to receiving a read request. Responsive to a write request directed to a logical data block, the generation number comparison unit 808 compares a generation number of the logical data block against the greater of a current generation number of a file associated with the logical data block and a current generation number of a fileset to which the file belongs. If the generation number of the logical data block is greater than the current generation number of the file and the current generation number of the fileset, the physical data block that maps to the logical data block is considered to be part of the current generation and the read/write unit 810 updates the physical data block in accordance with the write request. Otherwise, the physical data block is considered to be part of the snapshot generation and the read/write unit 810 transmits a request for a new physical data block to the metadata server 816. The read/write unit 810 can write content to the new physical data block in accordance with the write request.

The metadata server 816 communicates with the client nodes 802, 804, and 806 communicate via a communication network 814. The communication network 814 can include any technology (e.g., Ethernet, IEEE 802.11n, SONET, etc) suitable for passing communication between the metadata server 816 and the client nodes 802, 804, and 806. Moreover, the communication network 814 can be part of other networks, such as cellular telephone networks, public-switched telephone networks (PSTN), cable television networks, etc. The metadata server 816 and the client nodes 802, 804, and 806 can each read data from or write data to the data storage unit using any suitable block-level protocols, such as small computer system interface (SCSI), Internet SCSI (iSCSI), HyperSCSI, ATA over Ethernet, Fibre Channel, and Infini-Band. Additionally, the metadata server 816 and the client nodes 802, 804, and 806 can be any suitable devices capable of executing software in accordance with the embodiments described herein.

While the embodiments are described with reference to various implementations and exploitations, it will be understood that these embodiments are illustrative and that the scope of the inventive subject matter is not limited to them. In general, techniques for managing data access requests after a persistent snapshot as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
associating, at a client node on which a clustered file system is mounted, a first generation number with one or more files of the clustered file system, wherein the first generation number indicates a state of the one or more files following a snapshot of the one or more files;
in response to a write request directed to a first data block associated with the one or more files,
determining whether the first data block is part of the snapshot of the one or more files based, at least in part, on the first generation number;
if the first data block is determined not to be part of the snapshot of the one or more files, updating the first data block in accordance with the write request; and
if the first data block is determined to be part of the snapshot of the one or more files,
transmitting, to a server that co-ordinates a plurality of client nodes on which the clustered file system is mounted, an allocation request for a second data block for servicing the write request, wherein the plurality of client nodes comprise the client node;
identifying a data block mapping that maps a logical data block to the first data block; and
updating the data block mapping to map the logical data block to the second data block; and
updating the second data block in accordance with the write request,
wherein said updating the second data block in accordance with the write request if the first data block is determined to be part of the snapshot of the one or more files comprises:
copying content of the first data block to the second data block;
updating the content of the second data block in accordance with the write request.

2. The method of claim 1, wherein said determining whether the first data block is part of the snapshot of the one or more files in response to the write request directed to the first data block associated with the one or more files comprises:
determining a block generation number associated with the first data block;
determining that the first data block is associated with a first file of the one or more files;
determining a current file generation number associated with the first file;
determining a greater of the current file generation number associated with the first file and the first generation number;
comparing the block generation number against the greater of the current file generation number associated with the file and the first generation number;
determining that the first data block is not part of the snapshot if the block generation number is greater than the greater of the current file generation number and the first generation number; and
determining that the first data block is part of the snapshot if the block generation number is less than or equal to the greater of the current file generation number and the first generation number.

3. The method of claim 1, further comprising:
receiving the first generation number at the client node from the server;
determining that the client node comprises data not written to a storage disk associated with the clustered file system, in response to said receiving the first generation number;
flushing the data not written to the storage disk to synchronize the client node with the storage disk associated with the clustered file system; and
transmitting, to the server, metadata associated with the data flushed to the storage disk.

4. The method of claim 3, wherein said receiving the first generation number at the client node further comprises:
preventing purging of a cache associated with the client node to maintain data block mappings that indicate a mapping between logical data blocks of a file and physical data blocks on a storage disk and to maintain access permissions associated with the physical data blocks.

5. The method of claim 1, further comprising:
determining a new block generation number associated with the second data block;
updating metadata associated with the second data block to reflect the new block generation number associated with the second data block, wherein the new block generation number associated with the second data block indicates that the second data block is not part of the snapshot of the one or more files.

6. The method of claim 1, further comprising:
in response to a read request directed to a third data block associated with the one or more files, accessing the third data block based on data block mappings maintained by the client node.

7. The method of claim 6, wherein said accessing the third data block based on the data block mappings maintained by the client node comprises:
receiving the read request to access content of a file;
determining a logical data block that constitutes the file; and
determining, from the data block mappings maintained by the client node, the third data block of a storage disk associated with the clustered file system that maps to the logical data block that constitutes the file.

8. The method of claim 1, further comprising:
updating a predetermined memory location to replace a previous generation number associated with the one or more files and to store the first generation number.

9. A computer program product for managing data access requests after a persistent snapshot, the computer program product comprising:
a computer readable storage medium having computer usable program code embodied therewith, the computer readable program code configured to:
associate a first generation number with one or more files of a clustered file system, wherein the first generation number indicates a state of the one or more files following creation of a snapshot of the one or more files;
in response to a write request directed to a first data block associated with the one or more files,
determine whether the first data block is part of the snapshot of the one or more files based, at least in part, on the first generation number;

if the first data block is determined not to be part of the snapshot of the one or more files, update the first data block in accordance with the write request; and if the first data block is determined to be part of the snapshot of the one or more files, transmit, to a server that co-ordinates a plurality of client nodes on which the clustered file system is mounted, an allocation request for a second data block for servicing the write request;

identify a data block mapping that maps a logical data block to the first data block:

update the data block mapping to map the logical data block to the first data block; and update the second data block in accordance with the write request, wherein the computer readable program code configured to update the second data block in accordance with the write request comprises the computer readable program code configured to:

copy content of the first data block to the second data block; and update the content of the second data block in accordance with the write request.

10. The computer program product of claim 9, wherein the computer readable program code configured to determine whether the first data block is part of the snapshot of the one or more files in response to the write request directed to the first data block associated with the one or more files comprises the computer readable program code configured to:

determine a block generation number associated with the first data block;

determine that the first data block is associated with a first file of the one or more files;

determine a current file generation number associated with the first file;

determine a greater of the current file generation number associated with the first file and the first generation number; and compare the block generation number against the greater of the current file generation number associated with the first file and the first generation number;

determine that the first data block is not part of the snapshot if the block generation number is greater than the greater of the current file generation number and the first generation number; and determine that the first data block is part of the snapshot if the block generation number is less than or equal to the greater of the current file generation number and the first generation number.

11. The computer program product of claim 9, wherein the computer readable program code is further configured to:

receive the first generation number at the client node from the server;

determine that the client node comprises data not written to a storage disk associated with the clustered file system, in response to the computer readable program code receiving the first generation number;

flush the data not written to the storage disk to synchronize the client node with the storage disk associated with the clustered file system; and transmit, to the server, metadata associated with the data flushed to the storage disk.

12. The computer program product of claim 9, wherein the computer readable program code is further configured to:

determine a new block generation number associated with the second data block;

updating metadata associated with the second data block to reflect the new block generation number associated with the second data block, wherein the new block generation number associated with the second data block indicates that the second data block is not part of the snapshot of the one or more files.

13. The computer program product of claim 9, wherein the computer readable program code is further configured to:

in response to a read request directed to a third data block associated with the one or more files, access the third data block based on data block mappings maintained by the client node.

14. A machine comprising:

a processor;

a network interface coupled with the processor, the network interface operable to receive, at the machine on which a clustered file system is mounted, a first generation number associated with one or more files of the clustered file system, wherein the first generation number indicates a state of the one or more files following creation of a snapshot of the one or more files; and a generation number comparison unit operable to:

indicate the first generation number for the one or more files;

in response to a write request directed to a first data block associated with the one or more files, determine whether the first data block is part of the snapshot of the one or more files;

indicate to a read/write unit whether or not the first data block is part of the snapshot;

the read/write unit operable to:

if the generation number comparison unit indicates that the first data block is not part of the snapshot, update the first data block in accordance with the write request; and if the generation number comparison unit indicates that the first data block is part of the snapshot, transmit, to a server that co-ordinates a plurality of machines on which the clustered file system is mounted, an allocation request for a second data block for servicing the write request, wherein the plurality of machines comprise the machine;

identify a data block mapping that maps a logical data block to the first data block:

update the data block mapping to map the logical data block to the first data block; and update the second data block in accordance with the write request, wherein the read/write unit operable to update the second data block in accordance with the write request comprises the read/write unit being operable to:

copy content of the first data block to the second data block; and update the content of the second data block in accordance with the write request.

15. The machine of claim 14, wherein the generation number comparison unit operable to determine whether the first data block is part of the snapshot of the one or more files in response to the write request directed to the first data block associated with the one or more files comprises the generation number comparison unit operable to:

determine a block generation number associated with the first data block;

determine that the first data block is associated with a first file of the one or more files;

determine a current file generation number associated with the first file;

determine a greater of the current file generation number associated with the first file and the first generation number;
compare the block generation number against the greater of the current file generation number associated with the first file and the first generation number;
determine that the first data block is not part of the snapshot if the block generation number is greater than the greater of the current file generation number and the first generation number; and determine that the first data block is part of the snapshot if the block generation number is less than or equal to the greater of the current file generation number and the first generation number.

16. The machine of claim 14, wherein the generation number comparison unit and the read/write unit comprise the computer readable storage medium.

* * * * *